Oct. 20, 1959 R. G. GOLDMAN 2,909,658

ELECTRONIC FUNCTION GENERATOR

Filed July 23, 1957

INVENTOR.
RICHARD G. GOLDMAN
BY
Smith, Olsen, Baird & Miller,
Att'ys.

United States Patent Office 2,909,658

Patented Oct. 20, 1959

2,909,658

ELECTRONIC FUNCTION GENERATOR

Richard G. Goldman, Schenectady, N.Y., assignor to General Electric Company, a corporation of New York Application July 23, 1957, Serial No. 673,594

7 Claims. (Cl. 250—27)

Figure 1:
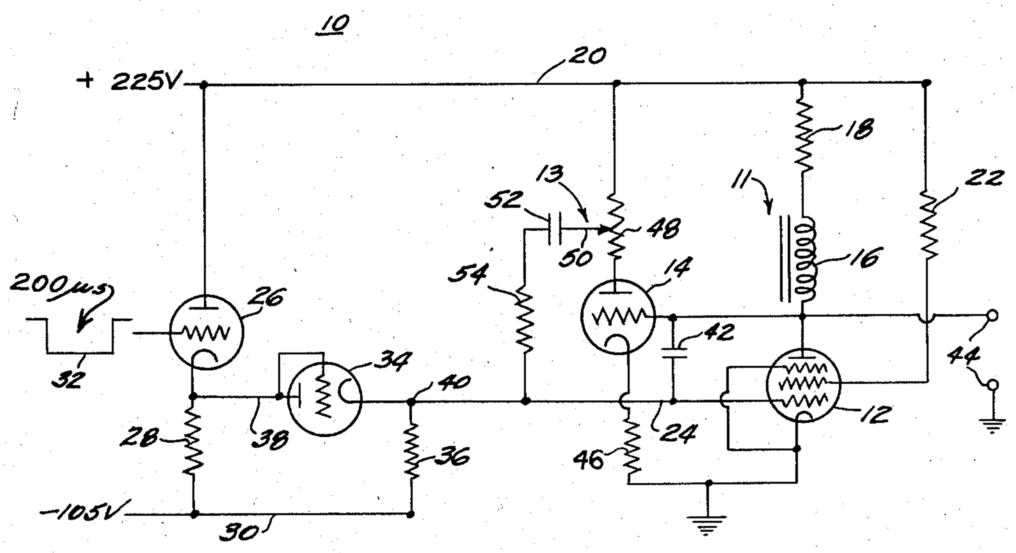

This invention relates to electronic function generators and particularly to sawtooth wave form generators which can be adjusted to produce wave forms representing the functions $\pm At$, $A(1-e^{-kt})$ and $Ae^{kt}$.

In general, prior electronic function generators generated only one type of function at a given output point and this necessitated duplication of apparatus when a plurality of different functions was desired.

Accordingly, it is an important object of the present invention to produce an improved electronic function generator of the type set forth.

More specifically, it is an object of the invention to provide an electronic function generator which can produce functions of the form $\pm At$, $A(1-e^{-kt})$ and $Ae^{kt}$.

Another object of the invention is to provide an electronic function generator of the type set forth in which the form of the function is not changed with changes in circuit conditions which change the slope of the wave form generated.

Yet another object of the invention is to provde an electronic function generator of the type set forth in which all three forms of functions generated thereby can be obtained at a single output point by a simple circuit adjustment.

Still another object of the invention is to provide an electronic function generator in which the output can be adjusted to be a linear sawtooth wave form having superior linearity as compared with prior devices.

Yet another object of the invention is to provide an electronic function generator which incorporates therein a second function generator, the output of which is applied to the control element of the first function generator to provide an integrated function generator.

A further object of the invention is to provide an electronic function generator in which a first generator is provided and a second generator are provided, the second function fenerator being controlled by the output of the first function generator and a portion of the output of the second function generator is applied to the control elements of the first function generator to modify the output therefrom whereby to produce a composite output function.

Figure 2:
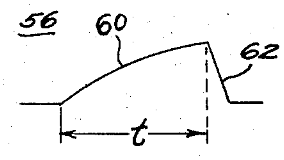
Figure 2A:
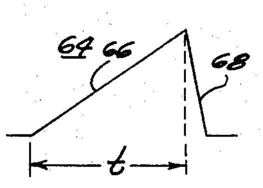
Figure 2B:
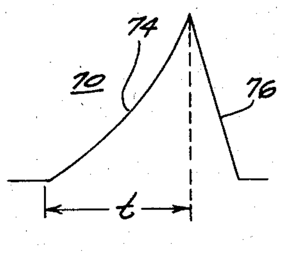

These and other objects and advantages of the present invention will be better understood from a consideration of the following description when taken in conjunction with the accompanying drawing. In the drawing, wherein like reference numerals have been utilized to designate like parts throughout:

Figure 1 is a schematic electrical diagram of an electronic function generator made in accordance with and embodying the principles of the present invention; and Figures 2, 2A and 2B are diagrams of three possible output functions which can be generated by the generator of Figure 1.

There is shown in Figure 1 of the drawings an electronic function generator generally designated by the numeral 10, made in accordance with and embodying the principles of this invention. Generator 10 includes a function generating stage 11 and an amplification stage 13 employing a first electron discharge device 12 and a second electron discharge device 14, respectively. Electron discharge device 12 has been illustrated as a high vacuum thermionic pentode tube including the usual anode, cathode, control grid, screen grid and suppressor grid. The cathode and the suppressor grid are shown as being connected together and grounded. The anode is connected to one end of an inductive reactor illustrated as a choke coil 16. The other end of choke coil 16 is connected through a resistor 18 with the B+ supply line 20 which is supplied from a 255 volt D.C. source. The screen grid is also connected to line 20 through a resistor 22 whereby to supply a positive operating potential to the screen grid of tube 12.

The control grid of tube 12 is connected to a line 24, arranged so that a synchronizing pulse is fed to control the operation of the function generator. Line 24 is connected to an input circuit which includes a tube 26 illustrated as a conventional high vacuum thermionic triode. The tube 26 is connected as a cathode follower. More specifically, the anode of tube 26 is connected directly to line 20 whereby to supply a 255 volt positive potential thereto. The cathode of tube 26 is connected through a resistor 28 to a line 30 which is maintained at −105 volts D.C. There is supplied to the control grid of tube 26 a negative going square wave form generally designated by the numeral 32. Wave form 32 has been illustrated as having a negative going duration of two hundred microseconds. There is disposed parallel to cathode resistor 28 a circuit including a control tube 34 and a resistor 36 disposed in series with each other. Tube 34 has been illustrated as a high vacuum triode in which the control grid has been connected to the anode. The anode is in turn connected through a line 38 to the cathode of tube 26. The cathode of tube 34 is connected to one end of resistor 36 and the other end of resistor 36 is connected to line 30 whereby to supply −105 volts thereto. The connection between the cathode of tube 34 and resistor 36, which is designated by the numeral 40, is attached to line 24 and through line 24 to the control grid of tube 12.

The operation of the function generator stage 11 including tube 12 is as follows. Tube 26 is normally biased whereby to be conducting. This develops a potential on the cathode sufficient to cause the conduction through the circuit including tube 34 and resistor 36. There is accordingly supplied through line 24 a potential on the control grid of tube 12 sufficient to cause heavy conduction thereof. The heavy conduction of tube 12 establishes a substantial electrical field about coil 16.

The negative going square wave 32 is then applied to the control grid of tube 26. Conduction through tube 26 is interrupted whereby to interrupt conduction of tube 34. This supplies a voltage of substantially −105 volts from line 30 through resistor 36 and line 24 to the control grid of tube 12. This tends to cut off tube 12 and stop conduction therethrough. The field about coil 16 begins to collapse whereby to generate a voltage tending to continue conduction of tube 12. A portion of this voltage is fed from the anode of tube 12 to the control grid thereof through a capacitor 42. As a result, the current flow through tube 12 gradually decreases.

The output from the function generator stage 11 utilizing tube 12 is taken from the plate thereof between output points 44. It will be seen that the potential between output points 44 will be low at the beginning of the cycle of operation due to the drop in potential across coil 16 and resistor 18. Upon the application of the negative going square wave to the control grid of tube 12, the potential at output points 44 will begin to rise. In the absence of the feedback capacitor 42 the rise in potential generated by the collapsing field about coil 16 can be resonant in character and of general sine wave form. The presence of the negative feedback capacitor 42 between the anode and the control grid tends to render the output wave form more linear. More specifically, the presence of capacitor 42 can so modify the operation of the stage including tube 12 as to cause the output wave form to approach a shape corresponding to the function $At$ as illustrated in Figure 2A of the drawing.

When the circuit elements have the values hereinafter set forth, the collapse of the field about coil 16 can be sufficient to produce an output voltage at points 44 which may be several times, and even as great as twenty times as much as the applied potential of 255 volts. This high voltage sawtooth wave form is generated when a balance is achieved between the anode current-grid bias characteristic of the tube 12, the inductive reactance of the choke coil 16 and the capacitive reactance of the feedback capacitor 42. Specifically, the tubes 12 and the quiescent state grid bias voltage thereof are chosen so that normally the tube is at full conduction and drawing a heavy plate current through the resistor 18 and the choke coil 16. Also, the inductance of the choke coil 16 is chosen to be of a sufficiently high value so that in response to small changes in the current flow therethrough a large voltage is induced across the output terminals thereof. Additionally, the value of the resistor 18 is chosen so that a large current flows therethrough and the gain of the circuit is maximum when the circuit is operating in its quiescent state. Further, the capacitance of the capacitor 42 is chosen with regard to the reactance of the choke coil 16 and with regard to the rate at which the anode current decreases when the cutoff voltage is applied to the control grid, so that the rate of the voltage rise at the output terminals 44 occurs at a rate not greater than the rate of the voltage rise across windings of the choke coil 16.

At the end of the negative going operation of wave form 32, the tube 26 is biased to be conducting again whereby a high and conducting potential is applied to the control grid of tube 12. The circuit, therefore, attempts to return to its quiescent state and the anode current through tube 12 tends to increase. Gradually the flow of current through tube 12, coil 16 and resistor 18 is reestablished. This corresponds to the negative going trailing edge portion of the wave forms in Figures 2, 2A and 2B of the drawing.

In accordance with the present invention, a portion of the potential developed at output points 44 and on the anode tube 12 is applied as the input to an amplifier stage, generally designated by the numeral 13. Amplifier 13 includes the electron discharge device 14 which has been illustrated as a high vacuum thermionic triode. The control grid of tube 14 is connected directly to the anode of tube 12. The cathode is connected through a resistor 46 to ground and the anode is connected through the resistive element of a potentiometer 48 to line 20 whereby to apply 255 volts thereto.

A portion of the signal developed across potentiometer 48 is picked up by the sliding contact 50 thereof and supplied through a blocking capacitor 52 and a resistor 54 to the control grid of tube 12 through line 24.

The operation of function generator stage 13 is related to the operation of stage 11 as follows. In the steady or quiescent state, tube 12 is conducting heavily, as has been explained above, whereby to produce on the anode thereof a relatively low positive potential. This positive potential is applied to the control grid of tube 14. This potential is relatively high for a biasing potential and, accordingly, there will be conduction of tube 14. The cathode resistor 46 provides a certain amount of self biasing whereby to keep operation of tube 14 in the linear portion of the operating characteristic curve thereof. Although the potential appearing on contact 50 may be relatively high, there will not be any feedback to the control grid of tube 12 through line 24 because of the presence of the blocking capacitor 52.

When the cutoff potential is applied to the control grid of tube 12, the flow of current therethrough is immediately decreased whereby to cause a rise in potential on the anode and at output points 44. This rise in potential is transmitted through capacitor 42 to the control grid of tube 12 whereby to provide a degenerative feedback. This feedback signal is also applied to the control grid of tube 14 whereby to increase the conduction through tube 14. This action will tend to lower the potential at contact 50 on potentiometer 48. This lowering of the potential is fed back through resistor 54 to line 24 and the control grid of tube 12. It will be seen that the amplifier stage 13 produces a feedback opposite in character to signal fed back through capacitor 42 and is more specifically of the general type known as positive feedback. This latter feedback is fed directly into the function generating stage 11 whereby to control directly the output from stage 11 at the output terminals 44. In effect, the amplifier stage 13 has been incorporated in the feedback path of the function generator stage 11. By adjusting the potentiometer 48 of generator stage 13, the output at terminals 44 can be varied in character to produce any of the functions $\pm At$, $A(1-e^{-kt})$ or $Ae^{kt}$. More specifically, if contact 50 is moved to the upper or higher potential end of potentiometer 48, an output wave form of the general character $A(1-e^{-kt})$ is developed. Movement of contact point 50 to this position is equivalent to removing the amplifier stage 13 from the feedback circuit of stage 11, since there will be no voltage variations appearing on contact 50 to be fed back to the control grid of tube 12. The resultant wave form 56 with the parts thus adjusted is illustrated in Figure 2 of the drawing. The parts are so chosen and proportioned that the wave form is substantially curved to show a decay of what would be otherwise a sawtooth wave form. Wave form 56 is generated by the collapse of the field about coil 16 in conjunction with degenerative feedback from condenser 42 which occurs when the cutoff voltage is applied to the control grid of tube 12. At the end of the square wave 32, the duration of which has been illustrated as 200 microseconds and designated by the letter $t$ in Figure 2, a conductive biasing potential is applied to the control grid of tube 12 and conduction thereof begins. The negative going portion 62 of wave form 56 is generated at this time.

Potentiometer 48 can be so adjusted that the output wave form at point 44 is a sawtooth wave form having a perfectly linear portion and having a constant slope as is illustrated in Figure 2A of the drawing. The sawtooth wave form 64 of Figure 2A includes a perfectly linear positive going portion 66 which is generated while the cut-off potential having a 200 microsecond duration, $t$, is applied to the control grid of tube 12. Such a wave form is obtained when the output feedback from amplifier stage 13 is exactly proportioned to counteract or eliminate the exponential portion of the function $A(1-e^{-kt})$ which is generated by coil 16 and capacitor 42 in the generating stage 11. In other words, the positive feedback from amplifier 13 is of a character and amount exactly to counteract the exponential portion of the degenerative feedback supplied through capacitor 42 to the control grid of tube 12. Accordingly, a linear sawtooth function of the general character $At$ is produced when the open loop gain goes to 1 in the feedback circuit. At the end of the negative going square wave applied to the control grid of tube 12, a negative going trailing edge wave form 68 is generated.

The positive feedback from stage 13 can be adjusted so that it is more than sufficient to counteract the exponential portion of the feedback through capacitor 42. In such cases the output at points 44 is of the general form $Ae^{kt}$. This can be accomplished by moving contact 50 along potentiometer 48 toward the anode of tube 14. There results a wave having the shape illustrated in Figure 2B of the drawing. More specifically, a wave form 70 is provided which rises exponentially in accordance with the function $Ae^{kt}$. At the end of the 200 microsecond negative square wave, the output voltage decays along the curve 76 until it reaches the quiescent or steady state value.

Though any number of possible values may be assigned to the circuit components employed in the electronic function generator circuit of Figure 1, the values employed in the embodiment thereof reduced to practice and responding in accordance with the wave form shown in Figures 2, 2A and 2B are as follows:

| | |
|---|---|
| **12** | 6CL6. |
| **14** | ½ 12AU7. |
| **16** | 120 henrys. |
| **18** | 36,000 ohms. |
| **22** | 50,000 ohms. |
| **26** | ½ 12AU7. |
| **28** | 22,000 ohms. |
| **34** | ½ 12AU7. |
| **36** | 220,000 ohms. |
| **42** | 510 micromicrofarads. |
| **46** | 10,000 ohms. |
| **48** | 50,000 ohms. |
| **52** | 0.1 microfarad. |
| **54** | 470,000 ohms. |

Because of the fact that amplifier stage 13 is incorporated in a feedback circuit for stage 11, the shape of the function output will not be changed with changes in the various circuit elements of stage 11. For example, when the potentiometer 48 is adjusted to produce the linear sawtooth wave form of Figure 2A, changes in the conditions surrounding the circuit elements of stage 11 will not interfere with the linearity of the output and there will be no need to readjust the contact 50 on potentiometer 48. This is also true of the other functions of the type illustrated in Figures 2 and 2B.

All of the various functions generated by the circuit 10 can be obtained at the single pair of output points 44. The choice of the function generated is readily made by moving contact 50 along potentiometer 48.

It will be seen that there has been provided an electronic function generator which fulfills all of the objects and advantages set forth above. Although one preferred embodiment of the invention has been shown for purposes of illustration, it is to be understood that various changes and modifications can be made therein without departing from the spirit and scope of the invention. Accordingly, the invention is to be limited only as set forth in the following claims.

What is claimed is:

1. An electronic function generator comprising a first amplifying device having a first control member, a first load impedance including a function generating impedance to generate a function across said amplifying device upon change of current therethrough, a source of power, means interconnecting said first amplifying device and said first load and said source of power in series circuit, a feed back element connected degeneratively to feed back a portion of the potential appearing across said first amplifying device to said first control member, a second amplifying device having a second control member, a second load impedance, means interconnecting said second amplifying device and second load and said source of power in series circuit, means to apply a portion of the potential appearing across said first amplifying device to said second control member, and means to apply a portion of the potential developed across said second load impedance to said first control member.

2. An electronic function generator comprising a first amplifying device having a first control member, a first load impedance including a function generating impedance to generate a function across said amplifying device upon change of current therethrough, a source of power, means interconnecting said first amplifying device and said first load and said source of power in series circuit, a feedback element connected degeneratively to feed back a portion of the potential appearing across said first amplifying device to said first control member, a second amplifying device having a second control member, a second load impedance, means interconnecting said second amplifying device and second load and said source of power in series circuit, means to apply a portion of the potential appearing across said first amplifying device to said second control member, means to apply a portion of the potential developed across said second load impedance to said first control member, and means to vary the potential fed back from said second load impedance to said first control member.

3. An electronic function generator comprising a first amplifying device having an anode and a cathode and a control grid, a source of power, a first load impedance including an inductance interconnecting said anode and said source of power, a feed back element connected degeneratively to feed back a portion of the potential appearing on said anode to said control grid, a second amplifying device having an anode and a cathode and a control grid, a resistor interconnecting the anode of said second amplifying device and said source of power, means interconnecting the control grid of said second amplifying device and the anode of said first amplifying device, and means to apply a potential derived from said resistor to the control grid of said first amplifying device.

4. An electronic function generator comprising a first amplifying device having an anode and a cathode and a control grid, a source of power, a first load impedance including an inductance interconnecting said anode and said source of power, a feedback element connected degeneratively to feed back a portion of the potential appearing on said anode to said control grid, a second amplifying device having an anode and a cathode and a control grid, a potentiometer including a resistor and a movable connector thereon, said resistor interconnecting the anode of said second amplifying device and said source of power, means interconnecting the control grid of said second amplifying device and the anode of said first amplifying device, and means interconnecting said movable connector and the control grid of said first amplifying device.

5. An electronic function generator comprising a first amplifying device having an anode and a cathode and a control grid, a source of power, a first load impedance including an inductance interconnecting said anode and said source of power, a feedback element connected degeneratively to feed back a portion of the potential appearing on said anode to said control grid, a second amplifying device having an anode and a cathode and a control grid, a potentiometer including a resistor and a movable connector thereon, said resistor interconnecting the anode of said second amplifying device and said source of power, means interconnecting the control grid of said second amplifying device and the anode of said first amplifying device, and a capacitor interconnecting said movable connector and the control grid of said first amplifying device.

6. An electronic function generator comprising a first electron discharge device having an anode and a cathode and a control grid, a source of power, a first load impedance including an inductance interconnecting said anode and said source of power, a capacitor interconnecting said anode and said control grid, a second electron discharge device having an anode and a cathode and a control grid, a potentiometer including a resistor and a movable connector thereon, said resistor interconnecting the anode of said second discharge device and said source of power, means interconnecting the control grid of said second discharge device and the anode of said first discharge device, and a blocking capacitor interconnecting said movable connector and the control grid of said first discharge device.

7. An electronic function generator comprising a first generator stage including a first electron discharge device having an anode and a cathode and a control grid, a source of power, a first load impedance including an inductance interconnecting said anode and said source of power, a capacitor interconnecting said anode and said control grid, said first generator stage generating a function of the type $A(1-e^{-kt})$, a second generator stage including a second electron discharge device having an anode and a cathode and a control grid, a potentiometer including a resistor and a movable connector thereon, said resistor interconnecting the anode of said second discharge device and said source of power, means interconnecting the control grid of said second electron discharge device and the anode of said first electron discharge device, and a blocking capacitor interconnecting said movable connector and the control grid of said first electron discharge device, said second generator stage causing said first generator stage to generate a function of the type $Ae^{kt}$, said adjustable connector being movable to generate any of the functions $A(1-e^{-kt})$ and $At$ and $Ae^{kt}$ on the anode of said first electron discharge device.

References Cited in the file of this patent

UNITED STATES PATENTS

| | | |
|---|---|---|
| 2,423,931 | Etter | July 15, 1947 |
| 2,621,292 | White | Dec. 9, 1952 |